United States Patent [19]
Dalebout et al.

[11] Patent Number: 5,951,441
[45] Date of Patent: Sep. 14, 1999

[54] CUSHIONED TREADMILL BELTS AND METHODS OF MANUFACTURE

[75] Inventors: William T. Dalebout; David J. Watterson, both of Logan; Greg W. Law, Smithfield, all of Utah

[73] Assignee: Icon Health & Fitness, Inc., Logan, Utah

[21] Appl. No.: 08/994,474

[22] Filed: Dec. 19, 1997

[51] Int. Cl.⁶ .................................................. A63B 22/02
[52] U.S. Cl. ........................... 482/54; 198/844.2; 474/253
[58] Field of Search ........................... 482/54; 198/844.2; 474/253, 254; 156/137, 138, 139, 140, 141, 142

[56] References Cited

U.S. PATENT DOCUMENTS

| | | |
|---|---|---|
| 766,930 | 8/1904 | Clemons .................................. 474/253 |
| 2,984,594 | 5/1961 | Runton . |
| 3,059,312 | 10/1962 | Jamieson . |
| 3,358,813 | 12/1967 | Kohlhagen et al. . |
| 3,641,601 | 2/1972 | Sieg . |
| 3,880,274 | 4/1975 | Bechtloff et al. . |
| 3,929,026 | 12/1975 | Hofmann . |
| 4,334,676 | 6/1982 | Schönenberger . |
| 4,369,081 | 1/1983 | Curry et al. . |
| 4,377,045 | 3/1983 | Aurensan . |
| 4,509,510 | 4/1985 | Hook . |
| 4,614,337 | 9/1986 | Schönenberger . |
| 5,330,401 | 7/1994 | Walstead . |
| 5,383,828 | 1/1995 | Sands et al. . |
| 5,487,707 | 1/1996 | Sharf et al. ............................. 474/253 |

*Primary Examiner*—Glenn E. Richman
*Attorney, Agent, or Firm*—Workman, Nydegger & Seeley

[57] ABSTRACT

A treadmill belt is provided having a base layer of synthetic fabric over which a stabilizing layer of polyvinylchloride is deposited. The combined base layer and stabilizing layer are formed into a continuous belt over which a compressible cushion layer is deposited. The opposing ends of the cushion layer are stitched together at a select angle relative to a transverse axis extending across the treadmill belt.

32 Claims, 5 Drawing Sheets

CUSHIONED TREADMILL BELTS AND METHODS OF MANUFACTURE

BACKGROUND OF THE INVENTION

1. The Field of the Invention

The present invention relates to belts for treadmills and, more specifically, cushioned treadmill belts.

2. The Relevant Technology

Treadmills have long been a favorite stationary means for exercising. A typical treadmill comprises an elongated base having a plurality of rollers formed thereon. A continuous treadmill belt longitudinally encircles the base resting on the rollers. Handrails project upward from the front of the base for stabilizing a user on the treadmill. During operation, the user selectively grips the handrails and begins to walk or run on the treadmill belt. The treadmill belt can be either motorized or rotate under the force of the user. In either case, the treadmill belt rotates on the rollers in a continuous circular fashion as the user runs or walks on the treadmill belt. This process continues until the user obtains a desired level of exercise.

One of the critical features in the manufacture of a treadmill is the treadmill belt. Initially, the belt must be sufficiently strong to resist the impact and shearing forces which are applied to the belt as the user moves thereon. Likewise the belt must be sufficiently flexible to continually bend in a relatively flat loop without fatigue or failure. To obtain these properties, treadmill belts are commonly made from durable woven fabric. Woven fabric, however, is subject to localization displacement at the point where the foot of a user impacts the belt. That is, since the woven fabric is made of individual fibers, select fibers move relative to other fibers as a result of the force applied by the user's foot. This localized displacement can make the user's footing unstable.

An additional problem with conventional belts is that although the material may be strong enough to withstand the forces applied by the user, it can be difficult to attach the ends of the material to make a continuous loop. Stitching the ends together is often inadequate. Furthermore, making a stitched seam horizontally across the belt produces a large bump which can detrimentally effect the ride of the belt on the rollers.

Conventional treadmill belts can also be jarring to the legs of a user. To provide belts that have the necessary strength to withstand running or jogging thereon, conventional belts are made from relatively dense strong materials. Such materials, however, provide little or no cushion for absorbing the impact of the runner. Although attempts have been made to produce cushioned treadmill belts, effective belts which can withstand the required impact and stresses and yet provide cushioning have not been produced.

OBJECTS AND BRIEF SUMMARY OF THE INVENTION

Accordingly it is an object of the present invention to provide improved treadmill belts and methods of manufacture.

Another object of the present invention is to provide methods for manufacturing treadmill belts which are cushioned so as to partially absorb the impact of the user.

Yet another object of the present invention is to provide methods for manufacturing treadmill belts as above which are capable of withstanding the forces applied thereto during use of the treadmill.

It is also an objective of the present invention to provide methods for manufacturing treadmill belts which produce a substantially smooth continuous ride over the rollers of the treadmill.

Finally, another object of the present invention is to provide methods for manufacturing treadmill belts as above which minimizes localized displacement caused by the user on the belt.

To achieve the foregoing objects, and in accordance with the invention as embodied and broadly described herein, a cushioned treadmill belt is provided. The treadmill belt comprises a base layer formed of a polyester woven fabric. A layer of polyvinylchloride is deposited over the base layer. The polyvinylchloride provides sufficient rigidity to the base layer to prevent localized displacement thereof during use of the treadmill belt. The base layer having the polyvinylchloride attached thereto is formed into a continuous belt by forming fingers at the opposing ends of the base layer. The fingers are configured to interlock when the opposing ends are aligned together. With the fingers interlocked, heated irons are applied against the fingers to melt them together, thereby forming a continuous engagement belt.

Next, a cushion layer of resiliently compressible foam is attached to the engagement belt. The cushion layer has a pressure sensitive adhesive formed on the back surface thereof. Pinch rollers are used to compress the back surface of the cushion layer against the top surface of the engagement belt, thereby securely attaching the cushion layer to the engagement belt. The opposing ends of the cushion layer are abutted at an angle offset from a transverse axis that extends across the treadmill belt. Conventional stitching is then used to secure the abutted ends together. In this configuration, the stitched seam gradually crosses over the rollers thereby minimizing any disturbance caused by the seam.

In the preferred embodiment, a cover layer made of a soft, durable material, such as terry cloth, is positioned over the exposed cushion layer. The cover layer is the surface on which the user walks or runs during use of the treadmill.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
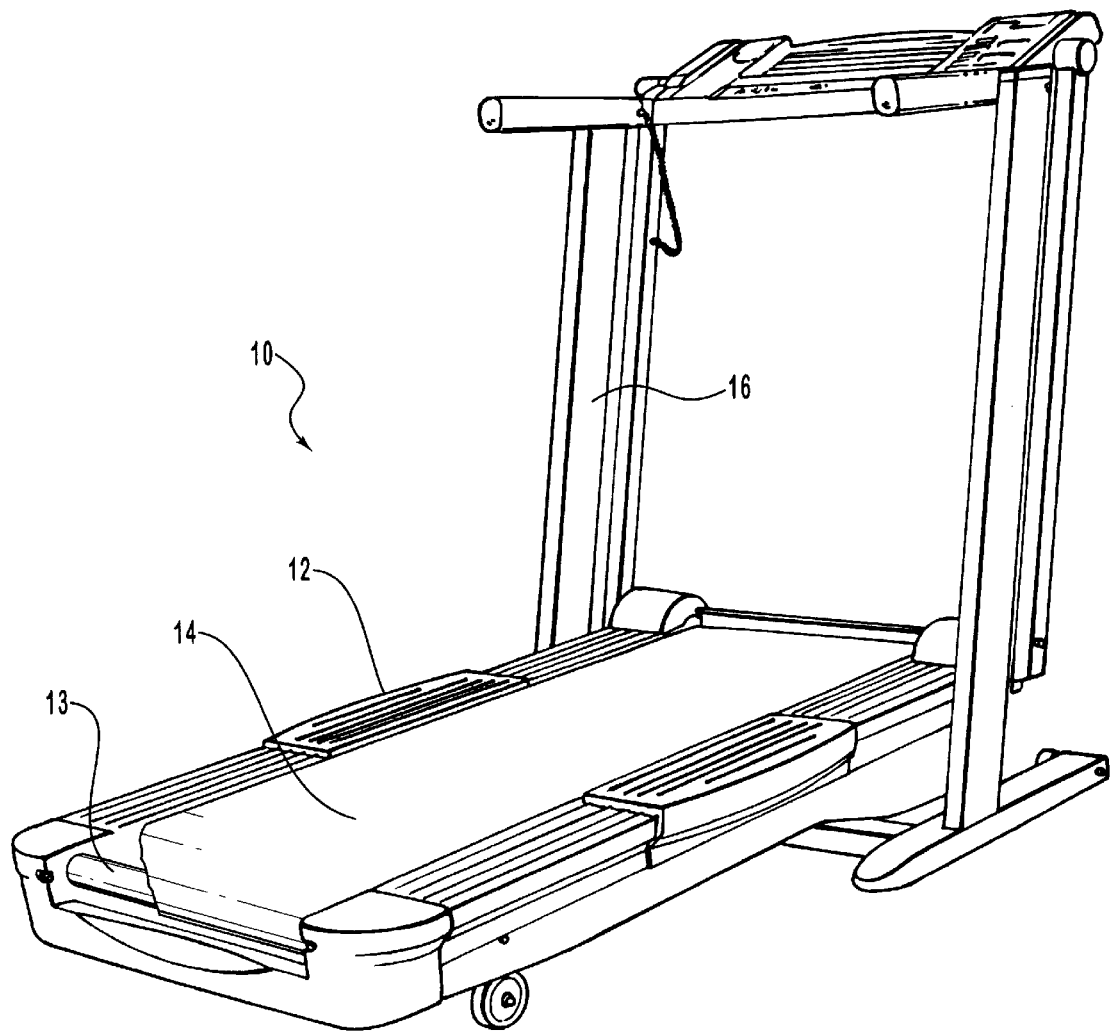
FIG. 1 is a perspective view of a treadmill having a treadmill belt.

Depicted in FIG. 1 is one embodiment of a treadmill 10 incorporating features of the present invention. Treadmill 10 includes a base 12 having a plurality of rollers 13 on which a continuous treadmill belt 14 is rotatably mounted. Upstanding at one end of base 12 is a handrail 16.

Treadmill belt 14 can be either motorized for automatic rotation or can be rotated subject to a force supplied by the user. In either embodiment, treadmill 10 is operated by a user standing on treadmill belt 14 adjacent to handrail 16. As the user walks or runs, treadmill belt 14 rotates, thereby allowing the user to continue to run or walk thereon while maintaining a relatively stationary position.

Figure 2:
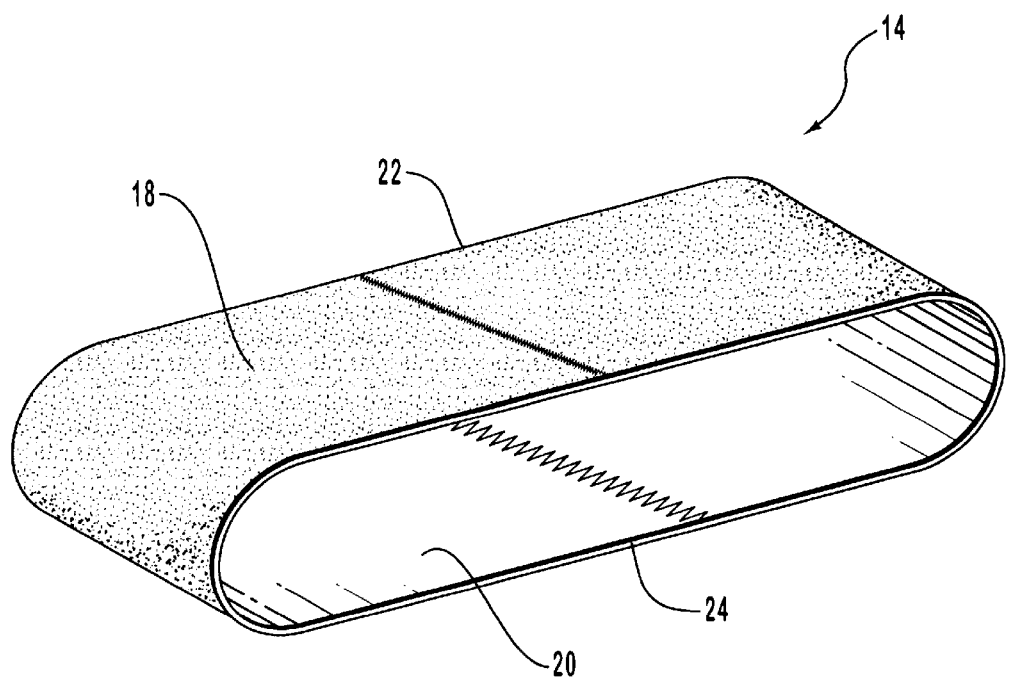
FIG. 2 is a perspective view of the treadmill belt shown in FIG. 1.

The novel features of treadmill 10 include the construction and configuration of treadmill belt 14. As depicted in FIG. 2, treadmill belt 14 has a configuration of a continuous loop with a top surface 18, and inside surface 20, and opposing side edges 22 and 24. Belt 14 comprises a plurality of different layers of material which are combined using unique manufacturing steps.

Figure 3:
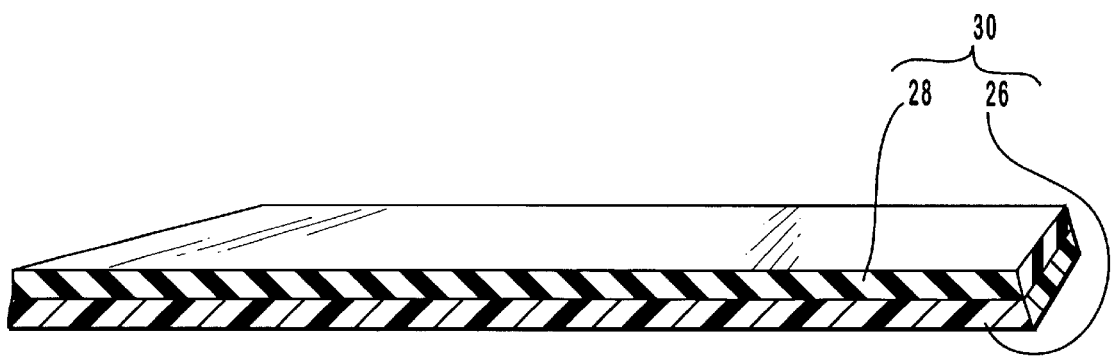
FIG. 3 is a perspective view of the base layer and the stabilizing layer of the treadmill belt shown in FIG. 2.

In one method for manufacturing belt 14, a base layer 26 is provided as depicted in FIG. 3. Base layer 26 defines interior surface 20 of treadmill belt 14 and is designed to ride on and bias against rollers 13 during rotation of treadmill belt 14. Base layer 26 is designed to withstand the localized forces which are applied to treadmill belt 14 as a result of a user running thereon. Such forces can be as high as 400–600 pounds per square inch. Furthermore, the material for base layer 26 is preferably, substantially non-extendable so as to prevent treadmill belt 14 from slipping on rollers 13. Base layer 26 can comprise a woven fabric material, preferably fiberglass, polyester, cotton, or other synthetic materials. Alternatively, natural materials or combinations thereof can also be used for base layer 26.

The present invention also provides stabilizing means applied to base layer 26 for so stiffening base layer 26 as to substantially preclude localized shear displacement of base layer 26 in the plane thereof when treadmill belt 14 is engaged by an operator on treadmill 10. That is, as a user runs or walks on treadmill belt 14, a localized sheer force is applied to base layer 26 at the point where the foot of the user lands on base layer 26. This sheer force can result in localized displacement or movement of base layer 26 relative to the remaining portion of base layer 26. This localized movement can make the user unstable. To help prevent this localized displacement, the stabilizing means can include, by way of example and not by limitation, disposing a stabilizing layer 28 over top of base layer 26. The stabilizing layer 28 can comprise polyvinylchloride, urethan, epoxy resins, and other polymeric resins.

Stabilizing layer 28 bonds to base layer 26 and is sufficiently flexible to enable base layer 26 to rotate in a continuous loop around rollers 13. In contrast to base layer 26, however, stabilizing layer 28 is a continuous solid matrix that is sufficiently stiff to substantially preclude localized sheer displacement of base layer 26. In an alternative embodiment to the stabilizing means, it is not necessary that a stabilizing layer be directly applied to the top of base layer 26. Rather, base layer 26 can be dipped, submerged, or otherwise impregnated with a stabilizing material such as those discussed above with regard to stabilizing layer 28.

Figure 4:
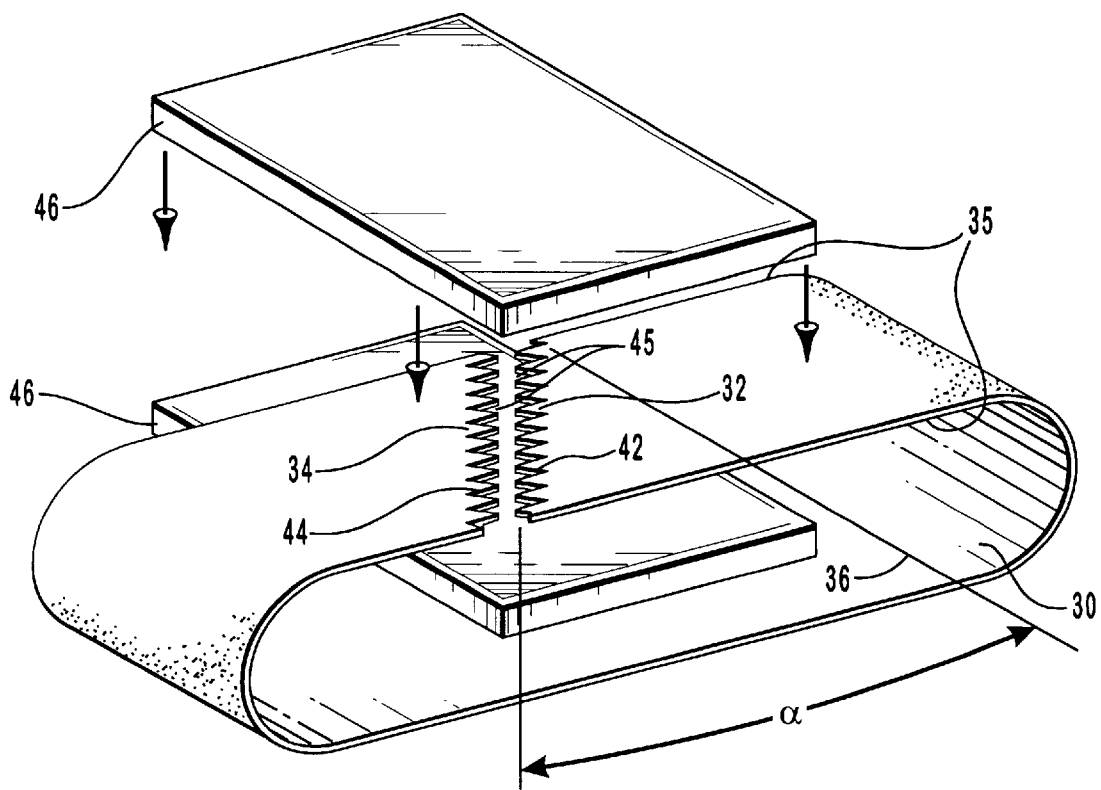
FIG. 4 is a perspective view of the opposing ends of the layers shown in FIG. 4 being selectively shaped and heat sealed together.

Base layer 26 and stabilizing layer 28 combine to form a compound layer 30. As depicted in FIG. 4, compound layer 30 is formed into an elongated narrow strip having a first end 32, an opposing second end 34, and parallel sidewalls 35. First end 32 is formed So as to be oriented at an angle α in a range between about 5° to about 50°, more preferably between about 10° to about 45°, and most preferably between about 15° to about 30° relative to a transverse axis 36 that extends across compound layer 30 so as to intersect the parallel sidewalls 35 at right angles. Second end 34 is formed at a complimentary angle to first end 32.

Projecting from first end 32 of compound layer 30 are a plurality of fingers 42. A plurality of fingers 44 also extend from second end 34 of compound layer 30. Fingers 42 and 44 are configured to substantially interlock or mesh when first end 32 and second end 34 are biased together. Fingers 42 and 44 are formed by simply cutting V-shaped notches 45 along ends 32 and 34.

Figure 5:
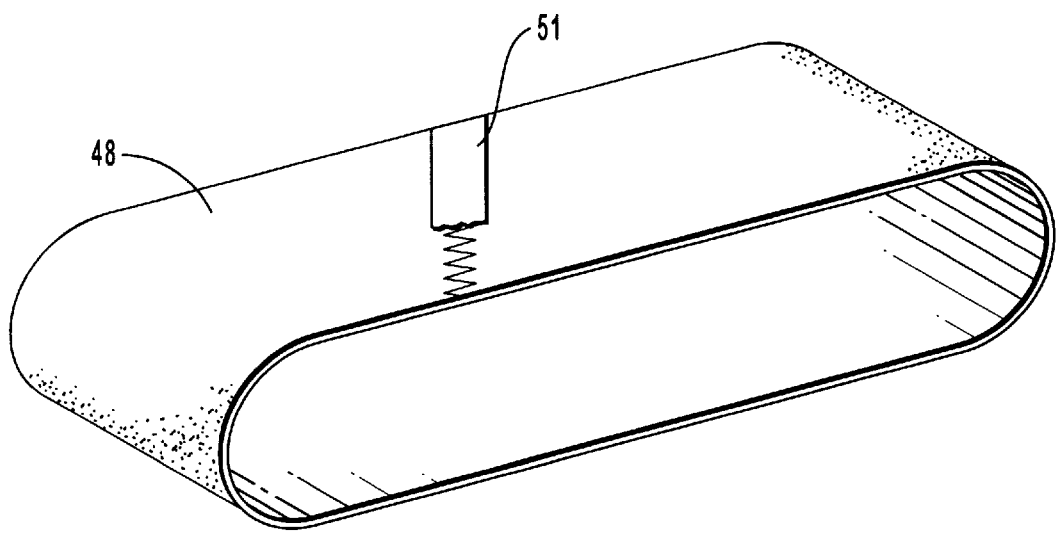
FIG. 5 is a perspective view of the layers shown in FIG. 4 after the ends thereof are sealed together.

The present invention also provides means for attaching first end 32 of compound layer 30 to second end 34. By way of example and not by limitation, depicted in FIG. 4 are a pair of heated irons 46. When fingers 42 and 44 are interlocked to form compound layer 30 into a continuous loop, irons 46 are positioned on opposing sides of interlocked fingers 42 and 44 and biased there against. In turn, heated irons 46 melt fingers 42 and 44 together to form a continuous engagement belt 48 as depicted in FIG. 5.

In an alternative embodiment, a supplemental layer 51 of stabilizing matter can be positioned over interlocking fingers 42 and 44 prior to applying irons 46. Supplemental layer 51 acts as an adhesive as it is melted over fingers 42 and 44.

Figure 6:
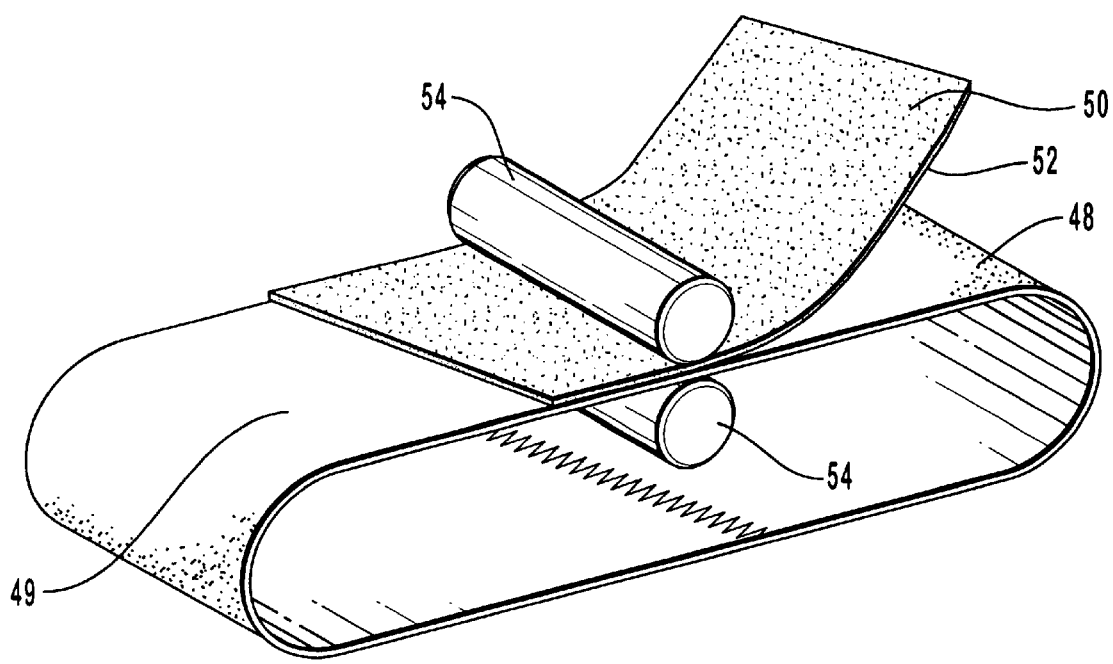
FIG. 6 is a perspective view of the belt shown in FIG. 5 having a cushion layer being attached thereto.

Once engagement belt 48 is formed, a cushion layer 50 is attached to a top surface 49 thereof, as depicted in FIG. 6. Cushion layer 50 can comprise any resiliently compressible organic foam material such as neoprene, PVC foam, and cross link polyethylene, or the like. Cushion layer 50 preferably has a thickness in a range between about ⅛ inch to about ¾ inch with about ⅛ inch to about ⅜ inch being most preferred. In one embodiment, cushion layer 50 has a back surface 52 on which a pressure sensitive adhesive is positioned. Pinch rollers 54, as depicted in FIG. 6, can thus be used to press back surface 52 of cushion layer 50 against top surface 49 of engagement belt 48, thereby securing cushion layer 50 to engagement belt 48.

The present invention also includes means for securing cushion layer 50 to engagement belt 48. One example of the securing means includes the pressure sensitive adhesive as discussed above. In alternative embodiments, cushion layer 50 can be secured to engagement belt 48 using a variety of different types of conventional adhesives stitching, or flame attachment.

Figure 7:
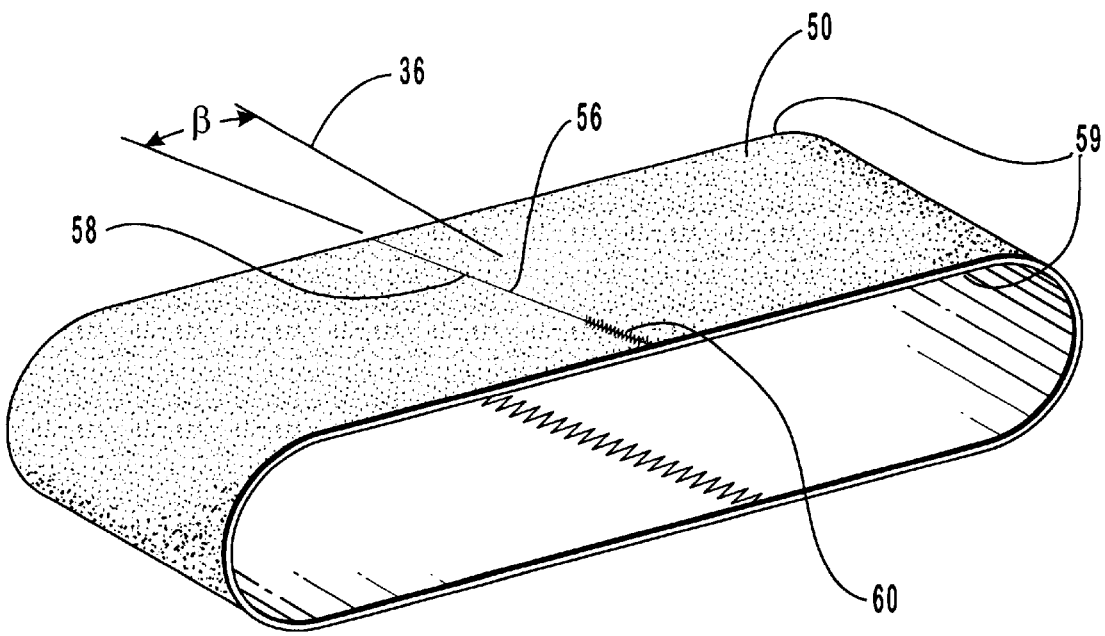
FIG. 7 is a perspective view of the belt shown in FIG. 6 with the opposing ends of the cushion layer being stitched together.

As depicted in FIG. 7, cushion layer 52 also has a first end 56, an opposing second end 58, and parallel sidewalls 59. As with the opposing ends of compound layer 30, first end 56 of cushion layer 52 is oriented at an angle β in a range between about 5° to about 50°, more preferably between about 10° to about 40°, and most preferably between about 15° to about 30° relative to a transverse axis 36 that extends across cushion layer 52 so as to intersect parallel sidewalls 59 at right angles. Second end 58 is formed at a complimentary angle to first end 56 so that first end 56 and second end 58 can be complimentarily aligned and butted against each other.

Means are also provided for attaching first end 56 of cushion layer 50 to second end 58 thereof. By way of example and not by limitation, stitching 60 can be sewn between first end 56 and second end 58. Stitching 60 extends through both cushion layer 50 and engagement belt 48. Alternative ways of connecting first end 56 of cushion layer 50 to second end 58 include adhesives and tapes. Although stitching 60 makes a slight bump along treadmill belt 14, by producing the seam at an angle relative to transverse axis 36, the seam gradually or incrementally crosses over rollers 13. As a result, the disturbance resulting from the seam is minimized.

Figure 8:
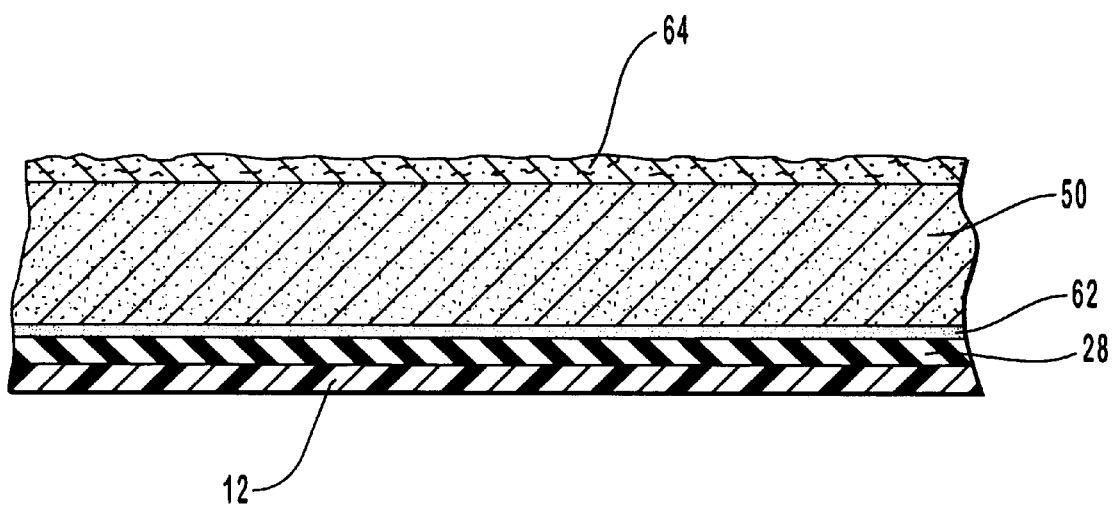
FIG. 8 is a side elevation view showing the layers of the treadmill belt shown in FIG. 7.

As depicted in FIG. 8, the resulting treadmill belt 14 comprises a plurality of layers. Specifically, treadmill belt 14 includes base layer 12, stabilizing layer 28, cushion layer 50, and an adhesive layer 62 attaching cushion layer 50 to stabilizing layer 28. In another embodiment, a cover layer 64 is positioned on top of cushion layer 50. Cover layer 64 is the surface on which the user walks or runs and is preferably soft yet having high durability. For example, cover layer 64 can be made from a synthetic fabric such as terry cloth.

One of the unique features of the inventive belt is that even though it is cushioned it is still able to travel around relatively small diameter rollers. For example, treadmill belt 14 can operate on treadmill 10 having a diameter in a range between about 1.5 inches to about 2.5 inches, with about 1.5 inches to about 2.0 inches being more preferred.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A continuous treadmill belt for supporting an operator during use of a treadmill, the treadmill belt comprising:
   a continuous engagement belt comprising a base layer of woven fabric and a stabilizing means for so stiffening the base layer as to substantially preclude localized shear displacement of the base layer in the plane thereof when the treadmill belt is engaged by the operator on the treadmill, the engagement belt having a top surface extending between opposing edges;
   a resiliently, compressible cushion layer positioned over the top surface of the engagement belt, a continuous integral portion of the cushion layer transversely extending between the opposing edges of the engagement belt; and
   attachment means for securing the cushion layer to the engagement belt.

2. A treadmill belt as recited in claim 1, wherein the woven fabric of the base layer is comprised of polyester.

3. A treadmill belt as recited in claim 1, wherein the engagement belt comprises a first end and an opposing second end which is secured thereto.

4. A treadmill belt as recited in claim 3, wherein the first end and the opposing second end of the engagement belt each have a plurality of fingers extending therefrom, the fingers at the first end being configured to complementary interlock with the fingers at the second end.

5. A treadmill belt as recited in claim 3, further comprising a heat seam where the first end and the opposing second end of the engagement belt have been melted together.

6. A treadmill belt as recited in claim 3, wherein the engagement belt has opposing parallel side edges and a transverse axis that extends across the engagement belt so as to intersect the side edges at right angles, the first end of the engagement belt being oriented at an angle in a range between about 10 degrees to about 45 degrees relative to the transverse axis.

7. A treadmill belt as recited in claim 1, wherein the stabilizing means comprises polyvinylchloride.

8. A treadmill belt as recited in claim 1, wherein the stabilizing means comprises urethan.

9. A treadmill belt as recited in claim 1, wherein the cushion layer comprises neoprene.

10. A treadmill belt as recited in claim 1, wherein the cushion layer comprises PVC foam.

11. A treadmill belt as recited in claim 1, wherein the cushion layer has a thickness in a range between about 1/8 inch to about 3/8 inch.

12. A treadmill belt as recited in claim 1, wherein the cushion layer comprises:
   (a) a first end and an opposing second end;
   (b) a pair of opposing side edges in parallel orientation; and
   (c) a transverse axis that extends across the cushion layer so as to intersect each of the side edges at right angles.

13. A treadmill belt as recited in claim 12, wherein the first end of the cushion layer is oriented at an angle in a range between about 10 degrees to about 40 degrees relative to the transverse axis extending thereacross.

14. A treadmill belt as recited in claim 12, wherein the attachment means comprises an adhesive.

15. A treadmill belt as recited in claim 1, further comprising a cover layer positioned over the cushion layer.

16. A continuous treadmill belt comprising:
   (a) a base layer of woven synthetic fabric;
   (b) a stabilizing layer of polyvinylchloride deposited over the base layer;
   (c) a resiliently, compressible cushion layer secured on top of the stabilizing layer; and
   (d) a cover layer of fabric material positioned on top of the cushion layer, the base layer, stabilizing layer, cushion layer, and cover layer each being secured together so as to preclude independent slipping of one layer relative to another layer.

17. A treadmill belt as recited in claim 16, wherein the base layer comprises polyester fabric.

18. A treadmill belt as recited in claim 16, wherein the cushion layer comprises neoprene.

19. A treadmill belt as recited in claim 16, wherein the cover layer comprises terry cloth.

20. A method for manufacturing a treadmill belt that supports an operator during use of a treadmill, the method comprising the steps of:
   (a) providing a base layer of woven fabric having a first end and an opposing second end;
   (b) applying a stabilizing material to the base layer, the stabilizing material substantially precluding localized shear displacement of the base layer in the plane thereof when the treadmill belt is engaged by the operator on the treadmill;
   (c) securing together the first end and the opposing second end of the base layer having the stabilizing material thereon to form a continuous engagement belt; and (d) compressing a cushion layer against the engagement belt using pinching rollers, the cushion layer having an adhesive on one side thereof that secures the cushion layer to the engagement belt.

21. A method as recited in claim 20, wherein the step of applying a stabilizing layer comprises disposing a layer of polyvinylchloride on the base layer.

22. A method as recited in claim 20, wherein the step of applying a stabilizing layer comprises dipping the base layer in urethan.

23. A method as recited in claim 20, wherein the securing step comprises:

(a) forming a plurality of fingers at the first end and the opposing second end of the base layer having stabilizing material applied thereto; and (b) interlocking the plurality of fingers at the first end of the base layer with the fingers at the second end of the base layer.

24. A method as recited in claim 23, further comprising heating the interlocking fingers so that the interlocking fingers are melted together.

25. A method as recited in claim 20, wherein the securing step further comprises shaping the first end of the base layer so that the first end is oriented at an angle in a range between about 10 degrees to about 40 degrees relative to a transverse axis that extends across the base layer so as to intersect the sides thereof at substantially right angles.

26. A method as recited in claim 25, further comprising shaping the second end of the base layer so that the second end is oriented at an angle complementary to the first end.

27. A method as recited in claim 20, wherein the cushion layer has a first end and an opposing second end, the attaching step farther comprising fashioning the first end of the cushion layer so that the first end is oriented at an angle in a range between about 10 degrees to about 40 degrees relative to a transverse axis that extends across the cushion layer so as to intersect the sides thereof at substantially right angles.

28. A method as recited in claim 28, further comprising fashioning the second end of the cushion layer so that the second end is oriented at an angle complementary to the first end.

29. A method as recited in claim 20, wherein the cushion layer has a first end and an opposing second end, the attaching step further comprising securing the first end of the cushion layer to the second end thereof.

30. A method as recited in claim 29, wherein the step of securing the first end of the cushion layer to the second end thereof comprising stitching the first end of the cushion layer to the second end.

31. A continuous treadmill belt for supporting an operator during use of a treadmill, the treadmill belt comprising:

(a) a continuous engagement belt comprising a base layer of woven fabric and a stabilizing means for so stiffening the base layer as to substantially preclude localized shear displacement of the base layer in the plane thereof when the treadmill belt is engaged by the operator on the treadmill;

(b) a cover layer of fabric material;

(c) a resiliently, compressible cushion layer positioned between the engagement belt and the cover layer, the cushion layer being secured to the engagement belt so as to substantially preclude any portion of the cushion layer disposed between the engagement belt and the cover layer from sliding relative to the engagement belt.

32. A method for manufacturing a treadmill belt that supports an operator during use of a treadmill, the method comprising the steps of:

(a) providing a base layer of woven fabric having a first end with fingers formed thereat and an opposing second end with fingers formed thereat;

(b) applying a stabilizing material to the base layer, the stabilizing material substantially precluding localized shear displacement of the base layer in the plane thereof when the treadmill belt is engaged by the operator on the treadmill;

(c) interlocking the fingers at the first and second end of the base layer having the stabilizing material thereon;

(d) heating the interlocking fingers so that the interlocking fingers are melted together, thereby forming a continuous engagement belt; and (e) attaching a resiliently compressible cushion layer to the engagement belt.

* * * * *